(12) United States Patent
Visser et al.

(10) Patent No.: US 12,121,864 B2
(45) Date of Patent: Oct. 22, 2024

(54) FLEXIBLY ADAPTABLE MEMBRANE CARTRIDGES FOR THE SEPARATION OF FLUIDS

(71) Applicant: Evonik Operations GmbH, Essen (DE)

(72) Inventors: Tymen Visser, EB Beek (NL); Steven K. Pedersen, Collingwood (CA)

(73) Assignee: Evonik Operations GmbH, Essen (DE)

( * ) Notice: Subject to any disclaimer, the term of this patent is extended or adjusted under 35 U.S.C. 154(b) by 278 days.

(21) Appl. No.: 15/748,183

(22) PCT Filed: Jul. 18, 2016

(86) PCT No.: PCT/EP2016/067030
§ 371 (c)(1),
(2) Date: Jan. 28, 2018

(87) PCT Pub. No.: WO2017/016913
PCT Pub. Date: Feb. 2, 2017

(65) Prior Publication Data
US 2018/0221824 A1 Aug. 9, 2018

(51) Int. Cl.
*B01D 65/00* (2006.01)
*B01D 53/22* (2006.01)
(Continued)

(52) U.S. Cl.
CPC ........... *B01D 65/003* (2013.01); *B01D 53/22* (2013.01); *B01D 63/02* (2013.01); *B01D 63/043* (2013.01);
(Continued)

(58) Field of Classification Search
CPC ........ B01D 63/02; B01D 69/00; B01D 53/22; B01D 63/10; B01D 2313/44; B01D 63/043; B01D 63/106; B01D 63/12; B01D 65/003; B01D 2313/04; B01D 2313/23; B01D 2317/02; B01D 63/021; B01D 63/022; B01D 69/06; B01D 63/046; B01D 2053/224; B01D 2313/12; B01D 65/00;
(Continued)

(56) References Cited

U.S. PATENT DOCUMENTS 3,422,008 A 1/1969 McLain
3,455,460 A 7/1969 Mahon et al.
(Continued)

FOREIGN PATENT DOCUMENTS

CN 103691323 4/2014
EP 0 492 250 7/1992
(Continued)

OTHER PUBLICATIONS

English language translation of the International Search Report for PCT/EP2016/067030 filed Jul. 18, 2016.
(Continued)

*Primary Examiner* — Hayden Brewster
(74) *Attorney, Agent, or Firm* — Law Office of: Michael A. Sanzo, LLC

(57) ABSTRACT

The present invention relates to novel cartridges and modules for separation of fluid mixtures, especially for gas separation, to a process for production thereof and to a method of use thereof.

20 Claims, 2 Drawing Sheets

(51) Int. Cl.
  *B01D 63/02* (2006.01)
  *B01D 63/04* (2006.01)
  *B01D 63/10* (2006.01)
  *B01D 63/12* (2006.01)

(52) U.S. Cl.
  CPC ......... *B01D 63/046* (2013.01); *B01D 63/106* (2013.01); *B01D 63/12* (2013.01); *B01D 2053/224* (2013.01); *B01D 2313/041* (2022.08); *B01D 2313/44* (2013.01)

(58) Field of Classification Search
  CPC .......... B01D 2313/10; B01D 2317/022; B01D 53/228; B01D 63/06; B01D 71/64; B01D 1/22; B01D 2053/221; B01D 2271/02; B01D 2313/083; B01D 2313/20; B01D 2313/221; B01D 2313/54; B01D 2315/10; B01D 2323/08; B01D 2325/022; B01D 29/111; B01D 29/23; B01D 46/0004; B01D 46/2414; B01D 61/026; B01D 63/024; B01D 63/025; B01D 67/0009; B01D 67/0083; B01D 69/08; B01D 2313/21
  See application file for complete search history.

(56) References Cited

U.S. PATENT DOCUMENTS

| | | | |
|---|---|---|---|
| 3,475,331 A | 10/1969 | McLain | |
| 4,207,192 A | 6/1980 | Coplan et al. | |
| 4,210,536 A | 7/1980 | Coplan et al. | |
| 4,220,489 A | 9/1980 | Coplan et al. | |
| 4,430,219 A | 2/1984 | Kuzumoto et al. | |
| 4,631,128 A | 12/1986 | Coplan et al. | |
| 4,715,953 A | 12/1987 | Leonard | |
| 4,865,736 A | 9/1989 | Coplan | |
| 4,881,955 A | 11/1989 | Bikson et al. | |
| 4,906,377 A * | 3/1990 | Yen | B01D 67/003 210/500.23 |
| 5,026,479 A | 6/1991 | Bikson et al. | |
| 5,084,073 A | 1/1992 | Prasad | |
| 5,160,042 A | 11/1992 | Bikson et al. | |
| 5,299,749 A | 4/1994 | Thorogood et al. | |
| 5,336,405 A * | 8/1994 | Tang | B01D 29/23 210/232 |
| 5,411,662 A | 5/1995 | Nicolas, Jr. et al. | |
| 5,470,469 A * | 11/1995 | Eckman | B01D 63/043 210/336 |
| 5,702,601 A | 12/1997 | Bikson et al. | |
| 5,837,032 A | 11/1998 | Moll et al. | |
| 5,837,033 A | 11/1998 | Giglia et al. | |
| 5,851,267 A * | 12/1998 | Schwartz | B01D 63/12 96/7 |
| 5,897,729 A | 4/1999 | Bikson et al. | |
| 6,224,767 B1 * | 5/2001 | Fujiwara | B01D 63/12 210/493.4 |
| 7,160,455 B2 * | 1/2007 | Taniguchi | B01D 63/02 210/321.79 |
| 7,410,580 B2 | 8/2008 | Koch et al. | |
| 7,998,254 B2 | 8/2011 | Burban et al. | |
| 8,728,213 B2 * | 5/2014 | Elwell | B01D 63/10 96/4 |
| 8,747,980 B2 * | 6/2014 | Bikson | B01D 53/22 428/36.9 |
| 8,778,062 B1 | 7/2014 | Snow et al. | |
| 9,061,253 B2 | 6/2015 | Yamanaka et al. | |
| 9,873,093 B2 | 1/2018 | Visser et al. | |
| 9,925,498 B2 * | 3/2018 | Toet | B01D 63/106 |
| 2006/0049093 A1 | 3/2006 | Chikura et al. | |
| 2006/0144777 A1 | 7/2006 | Kumano et al. | |
| 2007/0244212 A1 * | 10/2007 | Lehmann | C08L 23/02 522/120 |
| 2009/0054423 A1 * | 2/2009 | Imbriglio | C07D 231/56 514/230.5 |
| 2009/0277826 A1 * | 11/2009 | Pedersen | B01D 71/64 210/321.78 |
| 2012/0123079 A1 | 5/2012 | Ungerank et al. | |
| 2014/0174293 A1 | 6/2014 | Yamanaka et al. | |
| 2015/0060359 A1 * | 3/2015 | Wang | B01D 61/12 210/636 |
| 2015/0157985 A1 * | 6/2015 | Wang | B01D 61/147 210/652 |
| 2016/0310912 A1 | 10/2016 | Ungerank et al. | |
| 2017/0282131 A1 * | 10/2017 | Berzinis | A61M 1/1698 |
| 2021/0339189 A1 | 11/2021 | Winkler et al. | |
| 2022/0134274 A1 | 5/2022 | Pedersen et al. | |

FOREIGN PATENT DOCUMENTS

| | | |
|---|---|---|
| EP | 0 943 367 | 9/1999 |
| EP | 1 598 105 | 11/2005 |
| JP | H 11207156 | 8/1999 |
| JP | 2005111473 | 4/2005 |
| WO | WO 2012/122207 | 9/2012 |
| WO | WO 2014/198501 | 12/2014 |

OTHER PUBLICATIONS

English language translation of the Written Opinion of the International Searching Authority for PCT/EP2016/067030 filed Jul. 18, 2016.
English language translation of the International Preliminary Report on Patentability for PCT/EP2016/067030 filed Jul. 18, 2016.
U.S. Appl. No. 17/281,962, filed Mar. 31, 2021, US-2021/0339189 A1, Nov. 4, 2021, Winkler.
U.S. Appl. No. 17/427,555, filed Jul. 30, 2021, US-2022/0314274 A1, May 5, 2022, Pedersen.

* cited by examiner

FLEXIBLY ADAPTABLE MEMBRANE CARTRIDGES FOR THE SEPARATION OF FLUIDS

CROSS REFERENCE TO RELATED APPLICATIONS

The present application is US national stage of international application PCT/EP2016/067030, which had an international filing date of Jul. 18, 2016, and which was published in German under PCT Article 21(2) on Feb. 2, 2017. Priority is claimed to European application EP 15179092.0, filed on Jul. 30, 2015.

The present invention provides novel cartridges and modules for separation of fluid mixtures, especially for gas separation, a process for production thereof and a method of use thereof.

PRIOR ART

Membranes are used industrially in many sectors for separation of gas, liquid and gas/liquid mixtures, each referred to hereinafter as fluid mixtures. The membranes are generally used installed in modules or cartridges. Modules differ from cartridges in that they constitute a complete separation unit including the housing. Cartridges, in contrast, are used in separate housings, preferably in a housing installed into the separation system in a fixed manner. Cartridges thus have the advantage that lower costs arise on exchange thereof than in the case of modules, since the costly pressure-resistant housing need not be replaced as well.

While generally small-volume cartridges or modules are used in the sector of biogas processing, large-volume cartridges or modules are required, for example in the sector of purification of natural gas, to be able to cope with large volumes of gas. In addition, this field of use requires cartridges and modules which can be used at relatively high feed gas pressures, preferably of 30 to 100 bar.

For example, UOP sells Separex™ gas separation systems for purification of natural gas. These are cartridges in which flat-sheet membranes are wound around a central permeate collecting tube. A plurality of such cartridges are connected in series in a housing installed in a fixed manner in the gas separation system. The membranes consist of cellulose acetate. The UOP technology has the drawback that the cartridges have a relatively short lifetime and, according to the use conditions, may already have to be replaced after a period of months. Moreover, the capacity of the individual cartridges is unsatisfactory and there is a need for improved systems.

As well as the flat-sheet membrane modules which—as described above—are already being used commercially, there has been a multitude of attempts to produce cartridges or modules from hollow-fibre membranes as well. Examples of these can be found in U.S. Pat. Nos. 3,422,008, 3,455,460, 3,475,331, 4,207,192, 4,210,536, 4,220,489, 4,430,219, 4,631,128, 4,715,953, 4,865,736, 4,881,955, 5,026,479, 5,084,073, 5,160,042, 5,299,749, 5,411,662, 5,702,601, 5,837,032, 5,837,033, 5,897,729, 7,410,580, 7,998,254, 8,747,980, 8,778,062, EP 1 598 105 and CN 103691323.

EP 0 943 367 A1 describes a cartridge consisting of a membrane element and a sealing element secured reversibly thereto. The aim of that invention was, in the exchange of the cartridges, to be able to reuse the sealing element and to have to exchange the membrane element only. Hence the reversible attachment of the sealing element.

However, the cartridges described in EP 0 943 367 A1 have some drawbacks. For instance, the sealing element in the spiral-wound modules disclosed therein simultaneously constitutes the "anti-telescoping" plate.

In EP 0 943 367 A1, the cartridges are produced, stored and transported to the site of use without anti-telescoping plates. As a result, the cartridges, especially the end faces thereof, are not mechanically protected at these times. On installation into the pressure housing at the site of use, the cartridges then have to be connected to the sealing elements. The membranes can thus easily be damaged on the end faces in the course of transport or in the course of installation and hence their function can be impaired.

Moreover, the system of EP 0 943 367 A1 means that various seals are necessary in order to connect the sealing element to the membrane element in a fluid-tight manner. These seals are maintenance-intensive weak points. Moreover, the additional seals are consumable materials that cause additional costs.

US2006/0049093 likewise discloses cartridges having a spiral-wound membrane element and a sealing element. This sealing element likewise consists of a carrier element and a seal. Analogously to EP 0 943 367 A1, the membrane element in US2006/0049093 has no anti-telescoping plates. Here too, the sealing element replaces the anti-telescoping plates. By contrast with EP 0 943 367 A1, however, the sealing elements in US2006/0049093 are irreversibly bonded to the membrane element, meaning that the carrier element of the sealing element is bonded to the fluid-tight barrier and the permeate collection tube.

The system from US2006/0049093 has similar disadvantages to EP 0 943 367 A1. Moreover, the carrier element of the sealing element has to be adhesive-bonded to the fluid-tight barrier and the permeate collecting tube, which is very costly and inconvenient.

The operators of fluid separation systems in particular have an interest in being able to install cartridges from a number of suppliers into their systems. This increases competition between suppliers of the cartridges and hence lowers the cost thereof, but it additionally also increases operational reliability, since it is possible to avoid supply bottlenecks which can be caused by dependence on a small number of suppliers.

Against this background, suppliers of cartridges have a great interest in making their products usable in a maximum number of fluid separation systems. However, the problem arises here that module housings with different internal diameters and geometries may be present in different fluid separation systems. The cartridge manufacturer therefore has to hold specifically matched cartridge geometries in stock for every fluid separation system. This increases the complexity of the production process, and also of stock-keeping and logistics.

There is therefore a great need for a simple and inexpensive solution which allows adapting standard cartridges to various circumstances in different fluid separation systems.

Objects of the Invention

It was therefore an object of the present invention to provide novel cartridges or fluid separation systems which do not have the above-described disadvantages of the prior art cartridges or only have them to a reduced degree.

The novel cartridges should especially be suitable for replacing conventional cartridges in existing systems. At the same time, it should especially be possible in a simple and inexpensive manner to adapt the cartridges to various circumstances in different fluid separation systems.

In a further specific object, the cartridges of the invention are to be configurable in a flexible manner such that they can be provided with hollow-fibre membranes as well as with flat-sheet membranes.

In a further specific object, the novel cartridges or modules are to have at least comparable separation performances as compared with the prior art systems. Preferably, they should enable a longer operating time and/or be producible at lower cost and/or have better separation performance, especially based on the fluid volume per hour and/or the purity.

A problem addressed by the present invention was likewise that of providing cartridges of which the constituents have high mechanical stability and high mechanical protection from production until installation at the site of use. Moreover, the installation of the cartridges at the site of use should be possible in an uncomplicated and rapid manner.

Further objects not referred to explicitly are apparent from the overall context of the present description, examples, claims and drawings.

Advantages of the Invention

The inventors have now found that it is possible to achieve the abovementioned objects by providing cartridges (1) consisting of a membrane element (2) and an independent and hence reversibly connectable sealing element (3). The membrane element (2) comprises all the components of the cartridge (1) that are responsible for fluid separation. The sealing element (3) is an independent part of the cartridge (1) which has the function of connecting the cartridge (1), after installation into a module housing (4), in a fluid-tight manner to the inner surface of the module housing (4). This is necessary to prevent mixing of the feed stream to the cartridge (1) with the product stream thereof, generally the retentate stream. The sealing elements (3) of the invention consist of a seal (8) and a carrier element (9), the size and shape of the carrier element (9) being variable, and the carrier element (9) being reversibly connectable to the membrane element (2). The carrier element (9) is covered by a circumferential seal (8) on its surface (9a) facing the inner surface of the module housing (4), which establishes a fluid-tight connection with the module housing (4) after installation of the cartridge (1) into the module housing (4).

The cartridges (1) of the invention have the great advantage that the membrane element (2), which is the most costly part of the cartridge (1), can be produced in a standard size and the fitting to various geometries of module housings (4) requires merely exchange and adaption of the sealing element (3). Adapting corresponding sealing elements (3) is much less laborious than adapting complete membrane elements (2). It is also possible without any problem to keep various sealing elements (3) in stock and hence to be able to serve different customer requirements in a rapid and flexible manner. Causes of different customer requirements may be, apart from a variation in size of the modules caused by the gas volume to be cleaned, also variations in the thickness of the pressure-resistant module housing (4) resulting from the operating pressure. Higher pressures require thicker module housings (4). However, a greater thickness is generally manifested in a smaller internal diameter of the module housing (4). In such cases, the cartridges (1) of the invention have particular advantages by virtue of their variability.

The cartridges (1) of the invention can be adapted in a simple and flexible manner through use of different membrane elements (2). Thus, it is possible to use both hollow-fibre membranes and flat-sheet membranes, and various module constructions. Details of this are given further down.

Further advantages of the present invention that are not stated explicitly will become apparent from the overall context of the description, the examples, the claims and drawings.

The present invention has succeeded in providing cartridges (1) which, if desired, can be connected to one another to form a chain of cartridges and which can be used flexibly as replacement cartridges in many existing separation systems, for example those from UOP systems.

The present invention provides cartridges (1) according to claim 1 and fluid separation modules (7) according to claim 13. Preferred configurations are claimed in the dependent claims and elucidated in detail in the description which follows.

DETAILED DESCRIPTION AND DEFINITIONS

The present invention is described in detail hereinafter. First some important terms are defined.

The quotient of the permeances of the fluids to be separated, especially of the individual gases, determines the selectivity of a membrane with regard to separating the two fluids and thus indicates how efficiently the membrane is capable of separating a fluid mixture with regard to the two components. The term permeate applies to the entire stream generated on the low-pressure side of the membrane, membrane modules or membrane separation step.

Permeate fluid or permeate gas refers to the component(s) which the membrane, the membrane module or the membrane separation step each enrich(es) in the permeate stream compared with the respective entry stream.

Retentate refers to the entire stream generated on the high-pressure side of the membrane, membrane modules or membrane separation step and not passing through the membrane.

Retentate fluid or retentate gas refers to the component(s) which the membrane, the membrane module or the membrane separation step each enrich(es) in the retentate stream compared with the respective entry stream.

Fluid mixture to be separated, especially gas mixture to be separated, refers to a fluid mixture, preferably a gas mixture, of at least two fluids, preferably two gases, or a stream of this fluid mixture, preferably gas mixture, which is to be separated with the product of the invention or the device of the invention.

The preferred and specific embodiments of the products and devices according to the invention as described hereinafter, and also the preferred and particularly suitable designs and also the drawings and descriptions of drawings, will now be used to provide a merely illustrative further elucidation of the invention; that is, the invention is not limited to these exemplary embodiments and uses or to the particular combinations of features within individual exemplary embodiments.

Individual features indicated and/or depicted in connection with specific working examples are not restricted to these working examples or to the combination with the other features of these working examples, but can be combined where technically possible with any other versions even though these are not separately discussed in the present document.

Identical reference signs in the individual figures and illustrations of the drawings designate identical or similar components or components acting in an identical or similar manner. The depictions in the drawing also illustrate those features without reference signs, irrespective of whether such features are subsequently described or not. On the other hand, features which are included in the present description but are not visible or depicted in the drawing are also readily apparent to a person skilled in the art.

GENERAL DESCRIPTION OF THE CARTRIDGE (1) OF THE INVENTION

Figure 1:
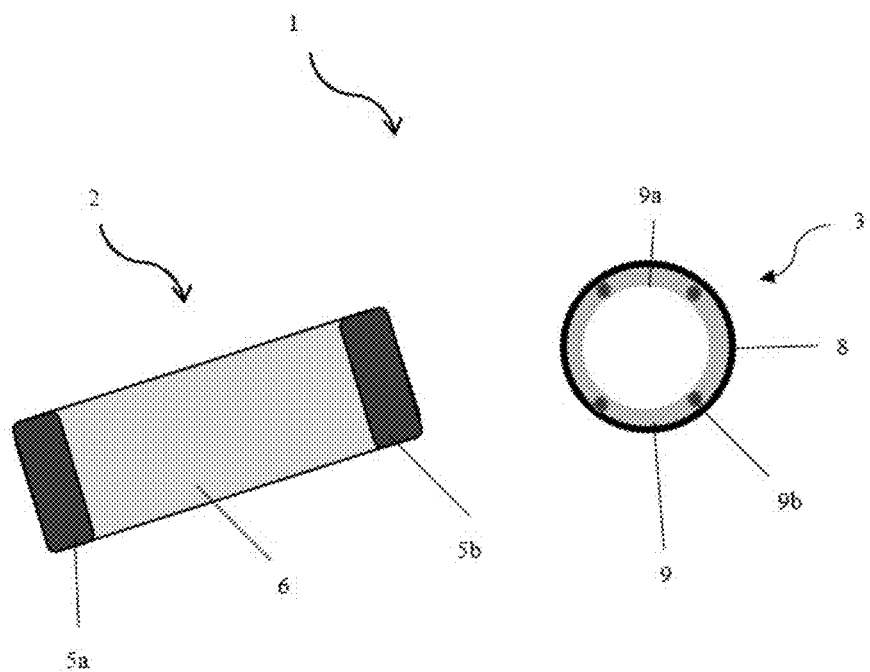
FIG. 1 shows an exploded view of a cartridge (1) of the invention having a membrane element and a sealing element (2) and (3) respectively.

With reference to FIG. 1, a cartridge (1) of the invention for separation of a fluid mixture, preferably of a gas mixture, comprises a membrane element (2) and a sealing element (3). In the membrane element (2), the fluid mixture is separated by means of hollow-fibre or flat-sheet membranes.
Description of the Sealing Element (3)

The sealing element (3) has the function of connecting the cartridge (1) of the invention in a fluid-tight manner to the inner wall of the module housing (4) after installation into a fluid separation module (7). This achieves the effect that the feed stream of the fluid mixture to be separated cannot mix with the retentate or permeate stream. It is a feature of the cartridges (1) of the present invention that the sealing element (3) is a separate, independent element of the cartridge (1).

The sealing element (3) consists of at least two parts, of which
  one part is a seal (8) which, after installation of the cartridge (1) into a module housing (4) of a fluid separation module (7), tightly adjoins the inner wall of the module housing (4), and
  a further part is a carrier element (9) which bears the seal (8) and which becomes reversibly connected to the front or back closure V1 (5a) or V2 (5b) of the membrane element (2).

Prior art cartridges likewise have seals which connect the cartridge to the inner wall of the module housing. It is usual in the prior art to use seals which either rest in the module housing or, as is the norm, at the front or rear closure of the membrane element. This means that the geometry of the membrane element has to be matched exactly to the geometry of the module housing. Thus, in the prior art, every change in the geometry of the module housing necessitates an adjustment of the entire geometry of the membrane element.

Figure 2:
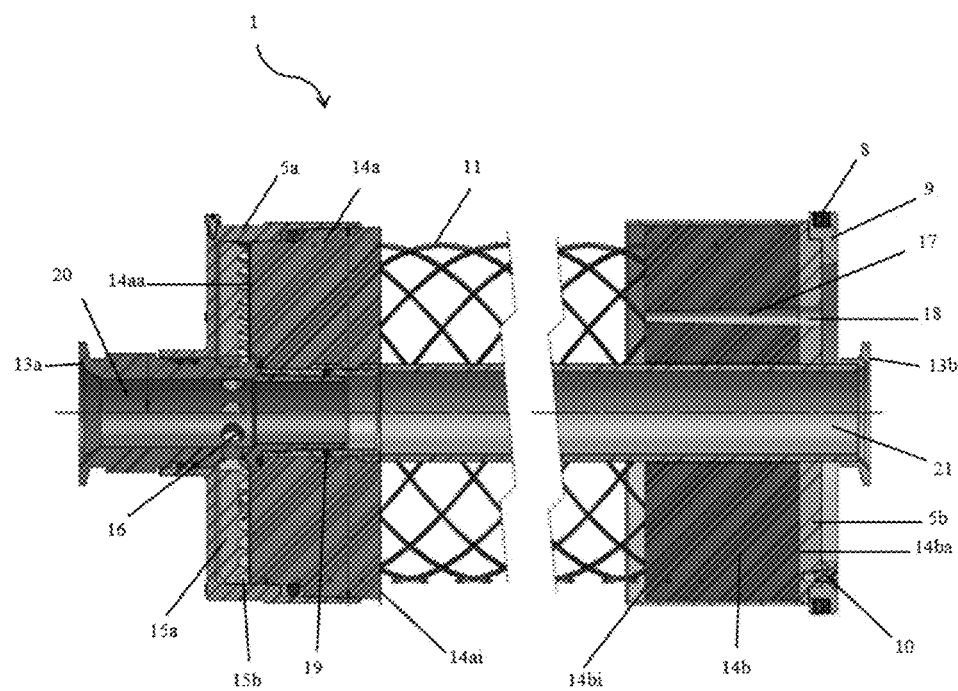
FIG. 2 shows a longitudinal section through a cartridge (1) of the invention, in which the sealing element (3) is fixed to the membrane element (2). In the embodiment shown, hollow-fibre membranes have been installed in the cartridge of the invention.

The present invention differs from the prior art in that the cartridges (1), as well as the membrane element (2), have an independent sealing element (3). This sealing element (3) in turn consists of a carrier element (9) and a seal (8). The carrier element (9) can be connected reversibly to the membrane element (2), more specifically to the front closure V1 (5a) or the rear closure V2 (5b). "Reversibly" means that the connection can be parted again without destroying the membrane element (2) or the carrier element (9). This is preferably achieved by virtue of the carrier element (9) being screw-connected to V1 (5a) or V2 (5b) or being connected thereto by means of screws or grip elements, preferably barbs or latching hooks, or with an adhesive. Combinations or modifications of the measures mentioned that can easily be found by a person skilled in the art are likewise possible. Preferably, at least a small amount of adhesive is used between the carrier element (9) and V1 (5a) or V2 (5b), in order to increase the gas-tightness of the connection. The properties of the adhesive have to be such as to enable destruction-free separation of the connection between carrier element (9) and V1 (5a) or V2 (5b). Particular preference is given to silicone adhesives. Likewise with particular preference, the carrier element (9) is connected to V1 (5a) or V2 (5b) by means of screws or grip elements. An example of this is shown in FIG. 2. While FIG. 1 shows bores (9b) in the carrier element (9) through which screws are passed, FIG. 2 shows how the carrier element (9) is fixed with screw (10) in the rear closure V2 (5b) of the membrane element (2).

The shape and geometry of the carrier element (9) can be configured as desired, and it can thus be adapted in a simple, rapid and inexpensive manner to different geometries of module housings (4). In contrast to the prior art cartridges, in the case of the cartridges (1) of the invention, it is not always necessary to adjust the geometry of the entire cartridge (1), but only that of the sealing element (9). The cartridges (1) of the invention are effectively a building block system in which several different membrane elements (2) (for details see below) can be combined with different sealing elements (3). It is therefore possible to satisfy different customer demands in a rapid and simple manner.

The carrier elements (9) may be of different configuration. They are preferably matched to the closure V1 (5a) or V2 (5b) of the membrane element (2) on which they are mounted. This relates to the fixing method, for example drillholes for screws (see (9b) in FIG. 1). However, it also relates to orifices for fluid streams which are conducted into and out of the cartridge (1) through the carrier element (9), according to whether the carrier element has been fixed to V1 (5a) or V2 (5b). Corresponding configurations for carrier elements (9) can easily be found by a person skilled in the art. A nonexhaustive list of preferred configurations includes:
  carrier elements (9) which take the form of a plate, which, according to whether they are attached to V1 (5a) or V2 (5b) of the membrane element (2), have fluid inlet orifices or outlet orifices,
  carrier elements (9) which take the form of a ring (see FIGS. 1 and 2), where the diameter of the opening in the middle of the ring is preferably between 35% and 80%, more preferably between 40% and 80% and most preferably between 50% and 75% of the external diameter of the respective closure V1 (5a) or V2 (5b) to which the carrier element (9) is connected,
  carrier elements (9) which take the form of a sieve (see FIG. 4).

The carrier element (9) may in principle be produced from any material that withstands the operating conditions of the fluid separation system, especially temperature and pressure. Preferably, the carrier element (9) is produced from metal or plastic. The carrier element (9) is more preferably produced from a high-performance plastic, most preferably from a fibre-reinforced high-performance plastic, for example PA (6, 6, 6, 12, etc.), PEEK, polyphenylene sulphite (PPS), polyphenylene ether/polystyrene mixtures (PPE/PS), polyphthalamide (PPA), or from metal, more preferably stainless steel or aluminium. The fibre reinforcement can more preferably be effected by means of glass fibres or carbon fibres or mineral fibres. Most preferred are glass fibres.

As already mentioned, the sealing element (3) also includes a seal (8) (see FIGS. 1 and 2). This seal is preferably arranged circumferentially around the carrier element (9). The seals (8) used are preferably symmetric grooved rings or O rings or wipers, more preferably symmetric grooved rings made from H-NBR (hydrogenated acrylonitrile-butadiene rubber).

In order to fix the seals (8) to the carrier element (9), the carrier element (9) preferably has grooves (see FIG. 2).

General Description of the Membrane Element (2)

The membrane element (2) has:
hollow-fibre or flat-sheet membranes (11) (not shown in FIG. 1) having a front end ME1 (11a) on the side on which the fluid mixture to be separated is supplied to the membranes, and a rear end ME2 (11b) on the opposite side,
a front closure V1 (5a) at ME1 (11a)
a rear closure V2 (5b) at ME2 (11b)
a barrier (6) which is impermeable to the fluid mixture to be separated and is arranged around the membranes (11) in the region between V1 (5a) and V2 (5b).

In particularly preferred embodiments (see, for example, FIG. 2), the membrane element (2) additionally has a permeate collecting tube PSR (13) which consists of one or more segments and has a front end PSRE1 (13a) and a rear end PSRE2 (13b). If the PSR (13) consists of several segments, for example (20) and (21) in FIG. 2, these are connected to one another within a membrane element (2) preferably by a screw connection or a flange connection or a plug-in connection or with a bayonet closure or by adhesive bonding.

Figure 3:
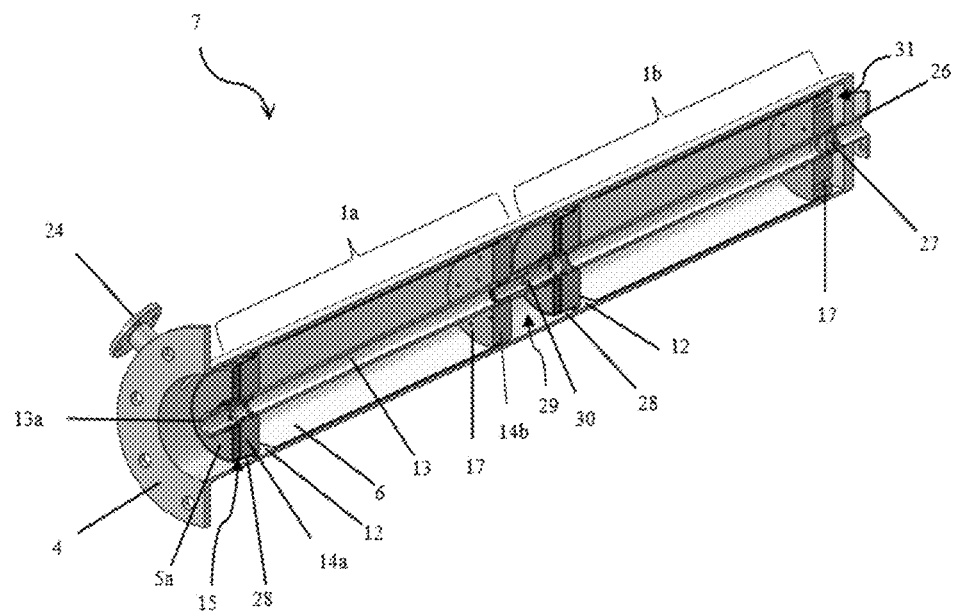
FIG. 3 shows, by way of example, a longitudinal section through a fluid separation module of the invention with two cartridges (1a) and (1b) of the invention inserted.

If a PSR (13) is used, the hollow-fibre or flat-sheet membranes (11) are arranged around the PSR (13), with the front end ME1 (11a) thereof on the side of PSRE1 (13a) and the rear end ME2 (11b) thereof on the side of PSRE2 (13b). Analogously, in this case, a barrier (6) which is impermeable to the fluid mixture to be separated is arranged around the arrangement composed of PSR (13) and hollow-fibre membranes (11) in the region between V1 (5a) and V2 (5b). Cartridges (1) having a central PSR (13) have the advantage that it is possible to arrange several thereof, as shown in FIG. 3, as a chain of cartridges in a module housing (4). The PSR (13) preferably consists of a material which is mechanically stable and corrosion-resistant under the operating conditions of the cartridge (1), i.e. at operating pressure and operating temperature. It may preferably be manufactured from a metal or a plastic. Particular preference is given to steel, aluminium or plastic, and very particularly to stainless steel.

For the membrane element (2) of the invention, it is in principle possible to convert known prior art cartridges, in which a sealing ring is mounted directly on the front or rear closure and not as a sealing element (3), to a membrane element (2) of the invention by configuring their front or rear closures such that the sealing element (3) can be secured thereon.

For production of the membrane element (2), it is possible to use hollow-fibre or flat-sheet membranes made from various materials, preferably polyether sulphone, polysulphone, polyetherimide, polyaramid, polyimide, polycarbonate, polyphenylene oxide, cellulose acetate, polyaryl ether ketone or polyether ether ketone. The choice of membranes depends on the separation problem. The cartridges (1) and modules (7) of the invention can be used for separation of liquids, gases and of mixtures of liquids and gases. They are preferably used for separation of gases. Depending on the separation problem, various commercial membranes are available.

For separation of gases, particular preference is given to hollow-fibre membranes made from polyimides, since these can be used at high temperatures and also have very good selectivity and permeance. Particular preference is given to polyimides which have been obtained by reaction of at least one dianhydride selected from the group consisting of 3,4,3',4'-benzophenone-tetracarboxylic dianhydride, 1,2,4,5-benzenetetracarboxylic dianhydride, 3,4,3',4'-biphenyl-tetracarboxylic dianhydride, oxydiphthalic dianhydride, sulphonyldiphthalic dianhydride, 1,1,1,3,3,3-hexafluoro-2,2-propylidenediphthalic dianhydride
and
at least one diisocyanate selected from the group consisting of toluene 2,4-diisocyanate, toluene 2,6-diisocyanate, 4,4'-methylenediphenyl diisocyanate, 2,4,6-trimethyl-1,3-phenylene diisocyanate, 2,3,4,5-tetramethyl-1,4-phenylene diisocyanate.

These preferred polyimides have a high plasticization resistance. Very particular preference is given to polyimides comprising the monomer units A and B, with:

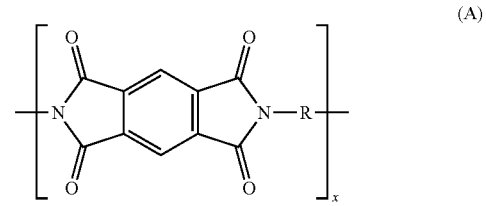

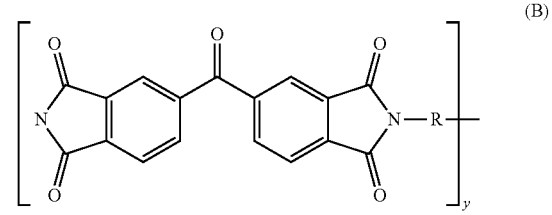

where $0 \leq x \leq 0.5$ and $1 \geq y \geq 0.5$ and R is one or more identical or different radicals selected from the group consisting of L1, L2, L3 and L4, with

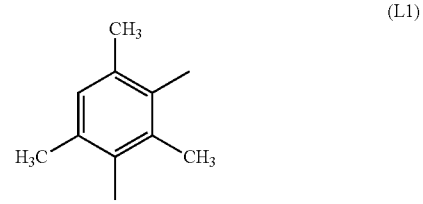

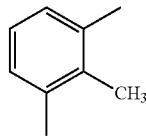
(L3)

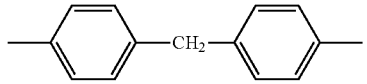
(L4)

Most preferred are polymers with x=0, y=1 and R consisting of 64 mol % of L2, 16 mol % of L3 and 20 mol % of L4. This polymer is commercially available under the P84 or P84 type 70 name from Evonik Fibres GmbH and is registered under CAS number: 9046-51-9. A further particularly preferred polymer consists of x=0.4, y=0.6 and R=80 mol % of L2 and 20 mol % of L3. This polymer is commercially available as P84HT or P84 HT 325 from Evonik Fibres GmbH and is registered under CAS number: 134119-41-8.

The hollow-fibre membranes used with preference in accordance with the invention have a diameter of 150 to 500 μm and/or a length of 150 to 300 cm.

If hollow-fibre membranes are used in the membrane element (2), several configuration with or without PSR (13) are possible. In general, the cartridges (1) of the invention, in the case of use of hollow-fibre membranes, have cast sections VA1 (14a) at ME1 (11a) and VA2 (14b) at ME2 (11b). These are produced from resins by known methods.

If a PSR (13) is used in the membrane element (2) together with hollow-fibre membranes, the hollow-fibre membranes are preferably arranged as a bundle (11) or in a plurality of bundles around the PSR (13), either parallel to the longitudinal axis of the PSR (13) or preferably wound around the PSR (13), more preferably wound helically, most preferably in such a way that the helical lines of each winding layer cross over, meaning that one layer is wound helically from the direction of VA1 (14a) to VA2 (14b), and then the next from the direction of VA2 (14b) to VA1 (14a), and then alternation continues in this way.

With this technique, it is possible also to produce large-volume cartridges (1), in which case it is preferable that the bundle of hollow-fibre membranes (11) has a substantially circular cross section having a diameter of 150-200 mm, preferably of 170-195 mm, more preferably of 180-190 mm.

In the case of different membrane elements (2), the closures V1 (5a) or V2 (5b) and also the impermeable barriers (6) may each be configured differently, or different combinations thereof may be present.

Figure 4:
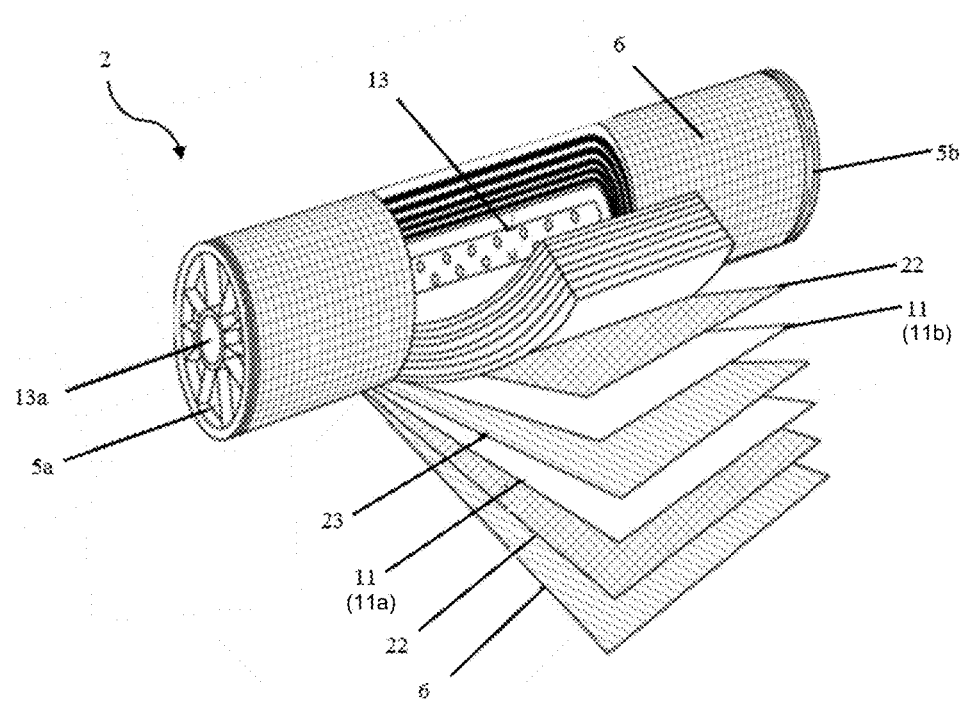
FIG. 4 shows the construction of a membrane element (2) with a wound flat-sheet membrane.

In a preferred embodiment, the impermeable barrier (6) is designed so as to be impermeable in the entire region between V1 (5a) and V2 (5b). More preferably, the barrier (6) in this case is connected to the closures V1 (5a) or V2 (5b) in a fixed manner. "In a fixed manner" means that the connection cannot be separated without mechanical destruction of the closure V1 (5a) or V2 (5b) or of the barrier (6). One example of this is shown in FIG. 4.

In another preferred embodiment, the barrier (6) has at least one fluid inlet or outlet in the region between V1 (5a) and V2 (5b). In the case of these cartridges, either the feed stream is routed through the fluid inlet or a permeate stream is drawn off through the orifices which then function as fluid outlet. Examples thereof are cartridges according to FIG. 2, although the impermeable barrier (6) and the fluid inlet or outlets are only shown in FIG. 3.

The impermeable barrier (6) preferably consists of a film or a hose or a tube or of a glass fabric "blended" with epoxy resin. Particular preference is given to materials which fit close to the membrane bundle or membrane winding, especially shrinkable materials, for example polyolefins, PVC or polyimides. This minimizes intermediate spaces between the barrier (6) and the outer surface of the membrane bundle or the winding and increases efficiency.

For processing reasons, it may be appropriate to surround the fibre bundle or the membrane winding, prior to the attachment of the barrier (6), with a suitable medium (not shown in the figures), for example a knitted nylon tube, in order to be able to apply the barrier (6) in a simpler manner and in order to keep the membrane bundle or the winding in shape.

In order to assure good attachment of the impermeable barrier (6) to the membrane element (2), it may be advantageous to cast the barrier (6) into VA1 (14a) and/or VA2 (14b). Alternatively or additionally, the barrier (6) can also be fixed to the membrane element (2) by external fixing aids, such as wires or clamps, or by welding or adhesive bonding or shrinkage. Combinations of the measures mentioned are possible as well as alternative technical solutions that are easy to find for a person skilled in the art.

The closures V1 and/or V2, by contrast with the sealing element including its constituents, are part of the membrane element and are bonded to the membrane element, preferably irreversibly. The closures are preferably bonded to the impermeable barrier and/or the membrane bundle and/or the membrane winding and/or a cast section and/or the permeate collecting tube. The attachment may be conducted by methods known to those skilled in the art.

The closures firstly have the function of mechanically protecting the ends of the membrane bundle or the end faces of the membrane windings or the cast sections. However, they also stabilize the geometry of the membrane element and form the attachment site for the sealing element.

Alternatively, the closures may fulfil additional functions, for example when they are in the form of end caps that establish fluid communication between the permeate collecting tube and the cores of the hollow fibre membranes. More detailed examples of such special functions are described further down.

The closures V1 (5a) and V2 (5b) may take the form of end caps or lids. "Cap", as opposed to a lid, for example, means that parts of the respective end cap are slid over one end ME1 (11a) or ME2 (11b) of the membranes or over the cast sections VA1 (14a) or VA2 (14b) generally present in the case of hollow-fibre membranes. One example of this can be found in FIG. 2. In the detailed description of the embodiment according to FIG. 2 which follows, the end caps EK1 and EK2 used therein are referred to as (5a) and (5b) respectively, since the end caps do indeed constitute the respective closures V1 and V2.

The closures V1 (5a) and V2 (5b) may alternatively take the form of a lid, e.g. disc with fluid inlet orifices or outlet orifices or sieves, arranged at the respective ends ME1 (11a) and ME2 (11b) of the membrane bundle or the winding. One example of this can be found in FIG. 4.

The closures V1 (5a) and V2 (5b) of the membrane element (2) of the invention preferably consist of a high-performance plastic, more preferably a fibre-reinforced high-performance plastic, for example PA (6, 6, 6, 12, etc.), PEEK, polyphenylene sulphite (PPS), polyphenylene ether/polystyrene mixtures (PPE/PS), polyphthalamide (PPA), or of metal, preferably stainless steel or aluminium. For fibre reinforcement, preference is given to using glass fibres or carbon fibres or mineral fibres, more preferably glass fibres.

In particular cases, the closures V1 (5a) and V2 (5b) may also be formed by the cast sections VA1 (14a) and VA2 (14b) themselves.

Various preferred configurations of membrane element (2) are described hereinafter.

Membrane Element (2) without PSR (13)

In a first particularly preferred embodiment, the cartridge (1) does not have a PSR (13). An example of a cartridge without PSR (13) can be found in WO 2014/198501. To avoid mere repetition, the disclosure of this application is hereby incorporated in full into the subject-matter of the present application. The cartridge (1) according to WO 2014/198501 can be used as membrane element (2) in the present invention when the closures V1 (5a) and V2 (5b), executed in WO 2014/198501 in the form of end caps, are provided with appropriate fixing means for the sealing element (3), for example drillholes for screws (10). Corresponding adjustments can be made in a simple manner by a person skilled in the art.

Membrane Element (2) Having Hollow-Fibre Membranes and a Porous PSR (13)

In a second particularly preferred embodiment, the membrane element (2) comprises, in addition to the features already described in general terms above:
- a permeate collecting tube PSR (13) which consists of one or more segments and has a front end PSRE1 (13a) and a rear end PSRE2 (13b),
- at least one bundle of hollow-fibre membranes (11) which has a front end ME1 (11a) and a rear end ME2 (11b) and is arranged around a PSR (13), the PSR (13) or all segments of the PSR (13) having one or more orifices or pores between ME1 (11a) and ME2 (11b) which ensure that the PSR (13) is in fluid communication with the interspace between the membrane (11), PSR (13) and impermeable barrier (6),
- a first cast section VA1 (14a) at ME1 (11a) and PSRE1 (13a) and a second cast section VA2 (14b) at ME2 (11b) and PSRE2 (13b), the cores of the hollow-fibre membrane being open at least at ME1 (11a), preferably at ME1 (11a) and ME2 (11b),
- a front closure V1 (5a) having at least one fluid entry orifice into or exit orifice out of the membrane element (2), preferably a fluid entry orifice for the fluid mixture to be separated into the membrane element (2),
- a rear closure V2 (5b) having at least one fluid entry orifice into or exit orifice out of the membrane element (2), preferably a fluid exit orifice for the retentate from the membrane element (2).

The way in which these cartridges (1) works is based on entry of the fluid mixture to be separated into the cores of the hollow-fibre membrane at V1 (5a). Between VA1 (14a) and VA2 (14b), the more readily permeating component of the fluid mixture then permeates through the membranes into the cavity between the impermeable barrier and the hollow-fibre membrane. From there, this permeate is routed through the holes in the PSR (13) into the interior of the PSR (13) and is removed through the latter. The retentate exits the membrane element (2) at ME2 (11b) or V2 (5b). VA1 (14a) and VA2 (14b) prevent backmixing of the permeate with the feed stream or the retentate stream. In this case the impermeable barrier (6) is designed to be impermeable throughout between VA1 (14a) and VA2 (14b).

In this case the sealing element (3) is preferably fixed at the front closure V1 (5a), but alternatively also at the rear closure V2 (5b), in order to prevent parts of the feed stream, i.e. of the gas mixture to be separated, from flowing through between the outer surface of the impermeable barrier (6) and the inner surface of the module housing (4) and from mixing with the retentate stream.

Membrane Element (2) Having Hollow-Fibre Membranes and a PSR (13) Fluid-Tight Between VA1 (14a) and VA2 (14b)

In a third, very particularly preferred embodiment, the membrane element (2) comprises, in addition to the features already described in general terms above:
- a permeate collecting tube PSR (13) which consists of one or more segments and has a front end PSRE1 (13a) and a rear end PSRE2 (13b),
- at least one bundle of hollow-fibre membranes (11) which has a front end ME1 (11a) and a rear end ME2 (11b) and is arranged around a PSR (13), the PSR (13) or all segments of the PSR (13) being configured in the region between ME1 (11a) and ME2 (11b) so as to be impermeable to the fluid mixture to be separated,
- a first cast section VA1 (14a) at ME1 (11a) and PSRE1 (13a) and a second cast section VA2 (14b) at ME2 (11b) and PSRE2 (13b), the hollow fibres at ME1 (11a) in VA1 (14a) being enclosed in such a way that the cores of the hollow-fibre membranes are open and the hollow fibres at ME2 (11b) in VA2 (14b) being enclosed in such a way that they are closed,
- a barrier (6) which is impermeable to the fluid mixture to be separated and surrounds the arrangement composed of PSR (13) and hollow-fibre membranes (11) in the region between VA1 (14a) and VA2 (14b), the impermeable barrier (6) being configured, based on the longitudinal axis of the cartridge, in the first third, preferably in the first quarter, of the distance between VA1 (14a) and VA2 (14b), more preferably at a distance of 0 to 10 cm behind the inner end face of VA1 (14ai) and most preferably at a distance of 2 to 4 cm behind the inner end face of VA1 (14ai), in such a way that one or more fluid entry orifice(s) or gap(s) (12) into the interspace between the impermeable barrier (6), the hollow-fibre membranes and the PSR (13) are present,
- a front end cap EK1, as front closure V1 (5a), placed onto VA1 (14a) and optionally a rear end cap EK2, if present, placed onto VA2 (14b), with VA2 (14b) or, if present, EK2 forming the rear closure V2 (5b), and is particularly characterized in that
- EK1 is configured and placed onto VA1 (14a) in such a way that an EK1 cavity (15) is formed between the outer end face of VA1 (14aa) where the permeate flows out of the hollow-fibre cores and the inner surface of the end cap EK1,
- permeate exit orifices (16) are present in the PSR (13) or in a segment of the PSR (13) in the region of the EK1 cavity (15), such that there is fluid communication between the fluid in the EK1 cavity (15) and the interior of the PSR (13),
- at least one exit orifice (17) for the retentate is present in the last quarter of the distance between VA1 (14a) and VA2 (14b) or embedded into VA2 (14b), where EK2, if present, likewise has at least one exit orifice (18) for the retentate.

An example of such a cartridge (1) including membrane element (2) and sealing element (3) can be found in FIG. 2. The embodiment depicted therein is particularly preferred, since this arrangement enables production of particularly efficient large-volume cartridges (1) which can be operated at high pressures.

A cartridge as shown in FIG. 2 but without sealing element (3), i.e. with seal (8) directly adjoining the cartridge, is disclosed in European patent application EP 15171206. To avoid mere repetition, the content of this application is hereby incorporated in full into the description of this application.

In the aforementioned embodiments, a one-piece PSR (13) can be used for each membrane element (2). However, division into several segments, as shown in FIG. 2, can have production-related advantages.

If the PSR (13) of a cartridge (1) consists of at least two segments (20) and (21), it is preferable that the first segment (20) begins at PSRE1 (13a) and extends at least into VA1 (14a) and is connected there to a second segment (21) which, alone or in conjunction with further segments, forms the rest of the PSR (13) as far as PSRE2 (13b), and it is particularly preferable that the first segment (20) comprises the permeate exit orifices (16) into the PSR (13). An example of this is shown in FIG. 2. This arrangement has production advantages, since, as will be elucidated further down in Example 1, the VA1 (14a) has to be cut open after production thereof, in order to open the cores of the hollow-fibre membranes. If a divided PSR (13) is used, the VA1 (14a) can be cut in a simple manner, for example with a saw. After this step, the segments (20) and (21) can then be assembled. If a one-piece PSR (13) is used, this has the disadvantage in the embodiment according to FIG. 2 that a more complex cutting method would have to be chosen for VA1 (14a), one which does not also cut the PSR (13) in this operation. Moreover, the divided version of the PSR (13) according to FIG. 2 has the advantage that the end cap EK1 (5a) can first be placed on and then the segment (20) can be introduced, and the segment (20), by virtue of the firm connection thereof to segment (21), fixes EK1 (5a) in the membrane element (2).

Further details and preferred configurations of this embodiment are described further down in connection with the description of a fluid separation module (7) of the invention, in which such cartridges (1) are used by way of example.

Membrane Element (2) Having Flat-Sheet Membranes

If flat-sheet membranes are used, the membrane element (2) preferably has:
- a permeate collecting tube PSR (13) which consists of one or more segments and has a front end PSRE1 (13a) and a rear end PSRE2 (13b),
- a front closure V1 (5a) having at least one fluid entry orifice or exit orifice, preferably a fluid entry orifice for the fluid mixture to be separated,
- a rear closure V2 (5b) having at least one fluid entry orifice or exit orifice, preferably an exit orifice (18) for the retentate,
- a membrane winding comprising
  - one or more flat-sheet membranes (11),
  - one or more porous feed channel spacer sheets (22) having a front edge ME1 (11a) on the V1 (5a) side on which the fluid mixture to be separated is preferably supplied, and a rear edge ME2 (11b) on the V2 (5b) side on which the retentate is preferably discharged,
  - one or more permeate channel spacer sheets (23) through which preferably the permeate is conducted to the PSR (13) arranged centrally in the core of the winding,
  where
    there is always at least one membrane sheet (11) present between a feed channel spacer sheet (22) and a permeate channel spacer sheet (23) and the PSR (13) has one or more orifices or pores for the permeate.

An example for a corresponding membrane element (2) can be found in FIG. 4. The production of such wound elements is common knowledge. Examples of these can be found in EP 0 492 250 A1 and WO2012122207A1. To avoid mere repetition, the content of these publications is hereby explicitly incorporated into the subject-matter of the description of the present application.

Fluid Separation Modules

The present invention encompasses, in addition to the above-described cartridges (1), also fluid separation modules (7) comprising one or more of said cartridges (1).

Preferred configurations of the fluid separation modules (7) of the invention comprise
- a pressure-resistant module housing (4) having a fluid inlet (24) and a permeate outlet (25) and a retentate outlet (26),
- one cartridge (1) or a plurality of cartridges (1) of the invention connected to form a chain of cartridges, arranged in the pressure-resistant housing (4),
- a connection of the permeate outlet (25) of the module housing (4) to PSRE1 (13a) of the cartridge closest to the permeate outlet of the housing (4) ((1a) in FIG. 3), where
- the retentate outlet in the module housing (26) is arranged downstream of the retentate outlet orifices (17) and/or (18) of the rearmost cartridge ((1b) in FIG. 3) in the housing (4),
- a fluid barrier (27), i.e. a fluid-tight closure of the PSR (13), arranged in the region of the PSRE2 (13b) of the cartridge or, when a plurality of cartridges are connected to form a chain of cartridges, of the PSRE2 (13b) of the rearmost cartridge of the chain of cartridges.

A preferred example of a fluid separation module (7) of the invention having a chain of two cartridges (1a) and (1b) of the invention according to FIG. 2 is shown in FIG. 3. With reference to FIG. 3, the fluid separation module (7) of the invention comprises a housing (4) in which there are, for example, two cartridges (1a) and (1b) of the invention. The fluid mixture to be separated passes through the fluid inlet of the module (24) into the interior of the housing (4). Subsequently, the fluid mixture is routed through a gap (28) between the end cap EK1 (5a) of the first cartridge (1a) and the inner wall of the module housing (4) to the fluid entry orifice (12) of cartridge (1a). The cartridge (1a) corresponds to FIG. 2 and consists of a permeate collecting tube PSR (13) arranged in a longitudinal axis, around which there is arranged a bundle of hollow-fibre membranes (11) (not shown in FIG. 3 for the sake of clarity). The hollow fibres have a front end ME1 (11a) and a rear end ME2 (11b). The front end ME1 (11a) is cast in the first cast section VA1 (14a) in such a way that the cores of the hollow fibres are open, meaning that the permeate can exit the hollow fibres at the outer end face of VA1 (10a) (see FIG. 2). The rear end of the hollow fibres ME2 (11b) is cast in a second cast section VA2 (14b), in such a way that the hollow-fibre cores are closed, meaning that no permeate can exit the hollow fibres on this side (see FIG. 2). The arrangement composed of PSR (13) and hollow-fibre membrane bundle (11) is enclosed completely between VA1 (14a) and VA2 (14b) by an impermeable barrier (6), apart from the fluid entry orifice (12). The fluid mixture to be separated is thus forced through the fluid entry orifice (12) into the interspace between the PSR (13), the hollow-fibre membranes (11) and the impermeable barrier (13). It comes into contact there with the outer shell of the hollow-fibre membranes (11).

As a result of a pressure differential of the fluid in said interspace (high-pressure region) and the core of the hollow-fibre membranes (low-pressure region), a relatively large amount of the more readily permeating fluid in the fluid mixture to be separated, possibly together with a smaller portion of the less easily permeating fluid, permeates through the hollow-fibre membrane and forms the permeate in the core of the hollow-fibre membrane. The more readily permeating fluid is thus enriched in the permeate, as compared with the fluid mixture to be separated.

The permeate is then routed through the core of the hollow-fibre membranes, through VA1 (14a) into a cavity (EK1 cavity (15)) which is formed between the inner surface of EK1 (5a) and the outer end face of VA1 (14aa). The EK1 cavity (15) is additionally in fluid communication with the PSR (13), meaning that the permeate can pass out of the EK1 cavity (15) through orifices (16) into the interior of the PSR (13) (see FIG. 2). From there, in turn, the permeate of the first cartridge (1a), together with that of the further cartridges in the same housing (3), is discharged from the module (7) through the permeate outlet of the module (6) (not shown in the figures).

In the EK1 cavity (15), there is preferably at least one support element (15a). With the aid of a support element (15a), it is possible to optimize the distribution of the permeate gas in the direction of the orifices (16) of the permeate collecting tube (13). With a suitable design, the support element (15a) can additionally contribute to improving the mechanical stability of the cartridge, especially at high pressures of the fluid mixture to be separated. In addition, the use of a suitable support element (15a) can additionally regulate the pressure drop resulting from expansion of the permeate fluids from the cores of the hollow-fibre membranes into the EK1 cavity (15). In order to route the permeate out of the cores of the hollow-fibre membranes in the direction of the orifices (16), the support element (15a) in the simplest case may be configured such that it fills the major portion of the EK1 cavity (15) and forms a gap between the side of the support element (15a) facing VA1 (14a) and VA1 (14a), through which the permeate gas is routed. Preferably, however, the support element (15a) is manufactured from a porous material and/or has internal and/or external channels, in which case the pores or channels are preferably configured in such a way that the permeate gas is guided in the right direction. In order to have a particularly positive effect on the distribution of the permeate gas in the direction of the orifices (16), the support element (15a) more preferably has an external shape suitable for routing the permeate from the exit orifices of the hollow-fibre membranes toward the orifices (16). An illustrative embodiment of this can be seen in FIG. 2. The EK1 cavity (15) in FIG. 2 is filled with a support element (15a). The support element (15a) has, on the side facing VA1 (14a), a profile (15b), or more specifically channels (15b), through which the permeate is routed from the cores of the hollow-fibre membranes to the orifice (16). Likewise preferably, it is possible to install a filter element (not shown in FIG. 2), for example a woven or nonwoven material or a sintered metal plate, between a support element (15a), with or without profile (15b), and VA1 (14a), which additionally promotes routing of the permeate to the orifice (16). Analogous technical configurations, for example designing the support element (15) as a part integrated into the front end cap (5a) in a fixed manner and not as an isolated part, which have the same functionality can easily be found by a person skilled in the art.

Preferably, the support element (15a) consists of corrosion-resistant materials, more preferably of stainless steel. Most preferably, the support element (15a) consists of the same material as the end cap (5a). Likewise more preferably, the support element (15a), as indicated above, is an integral constituent of EK1 (5a).

Particularly preferred filter elements consist of corrosion-resistant materials such as stainless steel, or else of bronze, brass or aluminium.

Most preferably, the filter element has pores or channels with a diameter which is at least by a factor of 5 to 10 smaller than the internal diameter of the hollow-fibre membranes, so that the permeate can flow freely and is not blocked.

As a result of the abovementioned permeation of the more readily permeating fluid into the core of the hollow-fibre membranes, the more slowly permeating fluid becomes enriched in the interspace between PSR (13) and impermeable barrier (6). The retentate forms therein from the fluid mixture to be separated, and is routed in said interspace in the direction of VA2 (14b) and becomes ever more enriched with the less easily permeating fluid in this period. VA2 (14b) is preferably surrounded by the second end cap EK2 (5b) (see FIG. 2).

The cartridge (1) of the invention is connected in a fluid-tight manner to the inner wall of the module housing (4) by the sealing element (3) fixed to EK2 (5b), in order to separate the fluid mixture (feed stream) to be separated from the retentate stream that exits the cartridge (1) behind EK2 (5b).

The sealing element (3), as already indicated, prevents the fluid mixture to be separated from mixing with the retentate of the first cartridge (1a). This is because the retentate flows through retentate outlets (17) and (18) (see FIG. 2) present in VA2 (14b) and in EK2 (5b), through the carrier element (9), out of the first cartridge (1a) and into the interior (29) of the housing (4) present between the cartridge (1a) and cartridge (1b).

The retentate of the first cartridge (1a) is concentrated further in the second cartridge (1b), which works and is constructed analogously to the first cartridge (1a), i.e. provides there the fluid mixture to be separated.

The PSR (13) of the second cartridge (1b) is connected to the PSR (13) of the first cartridge (1a) at the connection site (30), so as to give a common PSR (13) which extends from the front end PSRE1 (13a) of the permeate collecting tube of cartridge (1a) as far as the rear end PSRE2 (13b) of the PSR (13) of cartridge (1b).

At the end of the PSR (13) thus assembled is the fluid barrier (27) which is preferably arranged in the region of the VA2 (14b) of the rearmost cartridge in the chain of cartridges, and which can be produced from any desired fluid-tight, especially gas-tight, and sufficiently pressure-resistant material. "Sufficiently pressure-resistant" means that the permeate barrier (27) has to withstand the pressure differential between the permeate pressure in the PSR (13) and the retentate pressure in the end cavity (31). In addition, the fluid barrier has to be able to withstand the corresponding operating temperatures. The fluid barrier (31) therefore preferably consists of metal or plastic and is preferably fixed to the PSR (13) by screw connection or by flange or by means of barbs or by adhesive bonding. Corresponding technical solutions can easily be found by the person skilled in the art.

In the assembled permeate collecting tube (13), the overall permeate streams from the two cartridges (1a) and (1b) are removed together.

The connection (30) between the permeate collecting tubes (13) of the respective cartridges (1) can be made in different ways. For instance, the rear and front ends of the permeate collecting tubes PSRE1 (13a) and PSRE2 (13b) can be executed as a flange connection or as a plug-in connection or as a screw connection. Alternative connection options, for example barb systems, can easily be found by a person skilled in the art.

Analogously to the cartridge (1a), the cartridge (1b) has, at its rear end, a second VA2 (14b) and preferably an EK2 (5b). Through the retentate outlet orifices (17) in VA2 (14b) and, if an EK2 (5b) is present, through (18) in EK2 (5b), the retentate from the second cartridge (1b) passes into the end cavity (11) of the module housing (4). The end cavity (31) is formed by the outer end face of VA2 (14bi) or, if present, the EK2 (5b) of the second cartridge (1b) and the inner wall of the module housing (4) behind the second cartridge (1b). The effect of the second cartridge (1b) also being connected in a fluid-tight manner to the inner wall of the module housing (4) by a sealing element (3) (not shown in FIG. 3) and, in addition, of the PSR (13) having the permeate barrier (27) is that only retentate obtained after several separation steps is present in the end cavity (31), which is discharged from the module housing (4) through the retentate outlet (26).

It is thus a feature of the module (7) of the invention according to FIG. 3 that the fluid mixture originally to be separated is separated in two successive separation steps, first in cartridge (1a) and then in the second cartridge (1b). All the permeate streams are combined and conducted through the PSR (13) to the permeate outlet (25) of the module (7) present at the front cover (32) of the housing ((25) and (32) not shown in FIG. 3) and discharged from the module (7) therethrough. The front cover (32) is placed on after the module has been filled with the cartridges and is screwed to the housing (4) by means of the screw holes visible in FIG. 3. For the retentate too, only one outlet (26) in the module housing (4) is necessary. Since preferably all the cartridges have the same structure, the chain of cartridges, given a sufficiently long module housing (4), can be extended as desired, in that further cartridges (1) of the invention are inserted between cartridge (1a) and cartridge (1b).

Fluid separation modules (7) comprising the cartridges (1) of the invention have the advantage that the module housing (4) can remain permanently in the separation system and only spent cartridges (1) have to be exchanged. Cartridge exchange in turn is very simple and rapid, since the chain of cartridges as a whole can be removed from the housing. Thus, in the case of large systems having several hundred or thousand module housings, very short shutdown times are assured and maintenance costs are minimized.

The specific construction of the cartridges (1) of the invention additionally makes it easily possible to use different membrane elements (2), even if the respective membrane elements (2) themselves do not have the appropriate diameter. This can be compensated for by the sealing elements (3) of the invention.

As already mentioned, the cartridges (1) of the invention, in the preferred configuration according to FIG. 2, comprise a permeate collecting tube PSR (13) which has been configured in the interspace between VA1 (14a) and VA2 (14b) of the respective cartridge (1) so as to be impermeable to the fluid mixture to be separated. Otherwise, as described above, the fluid mixture to be separated which is present in the interspace between PSR (13) and impermeable barrier (6) would mix again with the permeate in the PSR (13).

However, in this embodiment the PSR (13) has to be in fluid communication with the fluid in the EK1 cavity (15) in the region of the EK1 cavity (15), so that the permeate can enter the PSR (13) at that point. Preferably, the PSR (13) therefore has orifices (16) in this region (see FIG. 2). There are no particular restrictions with regard to the size, shape and number of the orifices, provided that sufficient fluid communication is assured.

In this preferred embodiment, fluid entry orifices (12) are present in the impermeable barrier (6), as stated, or the impermeable barrier (6) does not extend over the entire distance between VA1 (14a) and VA2 (14b), so as to result in a gap as fluid entry orifice. Based on the longitudinal axis of the cartridge (1), the fluid entry orifices (14) are arranged in the first third, preferably in the first quarter, of the distance between VA1 (14a) and VA2 (14b), more preferably at a distance of 0 to 10 cm behind the inner end face (14ai) of VA1 (14a) and most preferably at a distance of 2 to 4 cm behind the inner end face (14ai) of VA1 (14a). This prevents dead volume and exploits the separation area of the membranes to the maximum.

At the rear end of the membrane bundle ME2 (11b) in the embodiment according to FIG. 2 is the second cast section VA2. On this side, there is no intention in this embodiment for permeate to exit the hollow-fibre cores. Therefore, the hollow fibres here are cast into the casting resin, such that all the hollow-fibre cores are sealed at the rear end of the hollow-fibre bundle ME2 (11b).

On the VA2 (14b) side, the retentate has to be able to exit the cartridge. It is therefore preferable to provide retentate outlet orifices (17) cast in VA2 (14b), through which the retentate can exit.

Analogously to EK1 (5a), EK2 (5b) is either connected in a fixed manner to the PSR (13) or a segment (20) or (21) of the PSR (13) or has, at its end face, an opening through which the PSR (13) or the PSR segment (20) or (21) can be introduced.

The module housing (4) has to be designed so as to be pressure-resistant and generally consists of metal, preferably of steel, more preferably of carbon steel.

The modules (7) and cartridges (1) of the invention can be constructed and used in any desired size. The diameter of the cartridges (1) is preferably in the range from 7 to 9 inches, preferably 7.5 to 8.5 inches, more preferably from 7.75 to 8.5 inches and most preferably from 8.0 to 8.25 inches. The length of the cartridges from PSRE1 (13a) to PSRE2 (13b) is preferably 0.5 to 2 m, more preferably 1 to 2 m, even more preferably 1.1 to 1.5 m and most preferably 1.3 to 1.4 m.

The modules (7) and cartridges (1) of the invention can be used at pressures in the range from 1 to 150 bar, preferably 30 to 120 bar and more preferably 40 to 100 bar. The operating temperatures are preferably −10 to 100° C. and more preferably 30 to 95° C.

The modules (7) and cartridges (1) of the invention are preferably used for separation of $CO_2/CH_4$ (e.g. biogas, natural gas or shale gas processing), $H_2$ streams, for example syngas ratio adjustment, recovery of $H_2$ or He recovery from source gas.

The examples which follow serve to provide more particular elucidation and better understanding of the present invention, but do not limit it in any way.

Example 1

First of all, hollow-fibre membranes were produced from P84HT according to Example 18 of WO 2011/009919 A1.

The hollow fibres were wound around a tube having an internal diameter of 43 mm and an external diameter of 51 mm and a length of 1750 mm, which later formed the second, i.e. rear, segment (21) of the permeate collecting tube (13).

The first layer was wound helically from the front end of the tube to the rear end. At that point, the membrane was wound several times at an angle of 90° to the longitudinal tube axis and then the second layer was wound helically from the rear to the front end of the tube. Here too there were some windings at an angle of 90° to the longitudinal tube axis, followed by the third layer which was now wound helically again from the front to the rear end of the tube. Winding continued layer by layer in the manner described until a fibre bundle having a diameter, in the middle of the tube, of 190 mm had formed.

The hollow-fibre bundle was then heat-treated in an N2 atmosphere at 315° C. for 60 min. After cooling, the bundle was secured with a tape at both ends of the winding immediately in front of the sites with winding at an angle of 90°, and cut off in each case behind the securing.

The arrangement composed of tube and hollow-fibre bundle thus obtained was pushed into a knitted nylon tube and then into a PVC shrinkable tube (impermeable barrier (6)), the length of which corresponded to the length of the shortened fibre bundle and which had 8 fluid entry orifices (12) in the first third of its length. The tube was shrunk onto the fibre bundle (11) at 100° C. within 10 minutes.

The arrangement thus obtained was secured in a centrifuge and casting moulds were mounted at either end, each of which was provided with an inlet for the casting resin. The casting mould at the rear end of the membrane bundle (ME2 (11b)), i.e. at the opposite end of the fluid inlets of the shrink tube (impermeable barrier (6)), had spikes which were inserted into the fibre bundle and which, in the later casting operation, formed the retentate exit orifices (17) in the cast section VA2 (14b). The casting moulds were provided with a release agent, in order to be able to release them from the respective cast section in a simpler manner after casting.

Before the permeate-side casting mould for VA1 (14a) was placed on, i.e. on the side on which the permeate was to exit the hollow-fibre cores at a later stage (ME1 (11a)), the fibre ends were treated with a high-temperature wax in order to prevent excessively deep inward suction of the casting resin.

The amount of the casting resin was calculated such that on both sides each of the casting moulds was completely filled.

With centrifugation, the two cast sections VA1 (14a) and VA2 (14b) were now formed at room temperature (<25° C.). The cast sections were then subjected to further heat treatment at 100° C. for 4 hours and, after the cast sections had been cooled down, the casting moulds were removed. The cast section VA1 (14a) was cut through with a circular saw at a point at right angles to the centre axis of the cartridge and 5 mm from the respective end of the PSR (13), as a result of which the hollow-fibre cores were opened on the permeate side. As a result, the later permeate outlets were produced in the EK1 cavity (15) that arose after the EK1 (5a) had been placed on.

The membrane element (2) thus obtained with the hollow fibres open at VA1 (14a) was tested for defective membranes by charging with a test gas, and defective or broken fibres were sealed with epoxy resin.

Thereafter, the two end caps EK1 (5a) and EK2 (5b) were placed on, the rear end cap EK2 (5b) having retentate outlets (18) and fixing points for the screws (10). Thereafter, as shown in FIG. 2, a sealing element (3) consisting of a carrier ring (9) and an O-ring (8) was fixed to the end cap VA2 (14b) with several screws (10). FIG. 2 shows only one screw (10) for the sake of clarity.

The front end cap EK1 (5a) was designed and prepared such that, after it had been pulled over VA1 (14a), the EK1 cavity ((15), see FIG. 2) was filled with a metal plate as support element (15a) and a sintered metal fabric arranged between the support element and the surface of VA1 (14a) facing it. The support element (15a) in turn was profiled on the side facing the sintered metal fabric, such that the permeate is routed through the channels in the profile (15b) from the cores of the hollow-fibre membranes (11) to the permeate exit orifices (16) in the front segment (20) of the permeate collecting tube (13).

Thereafter, the front segment (20) of the permeate collecting tube (13) was inserted through an opening in the end face of the front end cap EK1 (5a) and screw-connected at the connection site (19) to the rear segment (21) already present within the cartridge within VA1 (14a) (see FIG. 2). Said front segment (20) had permeate exit orifices (16) in the region of the EK cavity (15) through which, at a later stage, the permeate can flow out of the EK1 cavity (15) into the permeate collecting tube (13) (see FIG. 2).

Example 2

A cartridge (1) produced according to Example 1 was subjected to a separation and stress test in an appropriate test module housing (4).

For this purpose, in a cartridge produced according to Example 1, the rear end of the permeate collecting tube (13b) was closed with a screw-in plug or blank plug, and hence the fluid barrier (27) was established. Thereafter, the cartridge was inserted into the module housing and the housing was closed, with connection of the front end of the permeate collecting tube (13a) to the permeate outlet (25) of the test module housing (4).

A gas mixture composed of 20.9% $O_2$ and 79.1% $N_2$ was then pumped through the fluid inlet of the module housing (24) at 6.7 bara and 24° C., and the separation of the gas mixture was tested.

Thereafter, a pressure of 100 bar was applied three times on the feed side of the cartridge (1) with the permeate side remaining at atmospheric pressure. Thereafter, the separation test was repeated once more under the same conditions.

The results of the separation test before and after the stress test at 100 bar were identical, which proves that the cartridge of the invention can be used at high pressures and high gas volumes, meaning that the combination of membrane element (2) and sealing element (3) meets all requirements.

LIST OF REFERENCE NUMERALS 1 cartridge
1a cartridge 1
1b cartridge 2
2 membrane element
3 sealing element
4 housing of separation module
5 generally closure of the membrane element (2)
5a front closure V1 of the membrane element (2); term also used when this was implemented as an end cap EK1 as a specific configuration of closure V1,
5b rear closure V2 of the membrane element (2); term also used when this was implemented as an end cap EK2 as a specific configuration of closure V2, 6 impermeable barrier
7 fluid separation module
8 seal
9 carrier element
9a surface of the carrier element (9) facing the inner surface of the module housing (4)
9b drillholes in the carrier element (9)
10 screw
11 membrane or membrane bundle or winding
11a membrane front end ME1
11b membrane rear end ME2
12 fluid entry orifice or gap of membrane element (2)
13 permeate collecting tube
13a front end of permeate collecting tube (13) PSRE1
13b rear end of permeate collecting tube (13) PSRE2
14a front cast section VA1
14aa outer end face of VA1
14ai inner end face of VA1
14b rear cast section VA2
14ba outer end face of VA2
14bi inner end face of VA2
EK1 cavity between outer end face of VA1 (14aa) and the inner surface of end cap EK1 (5a)
15a support element
15b profile of support element (15a)
16 permeate exit orifices through which the PSR (13) is in fluid communication with the EK1 cavity (15)
17 retentate outlet orifices in VA2 (14b)
18 retentate outlet in EK2 (5b)
19 connection point between (20) and (21)
20 front sub-segment of the permeate collecting tube (13) of a cartridge (permeate adapter)
21 rear sub-segment of the permeate collecting tube (13) of a cartridge
22 feed channel spacer sheet
23 permeate channel spacer sheet
24 fluid inlet of the separation module into the module housing (4)
25 permeate outlet of the separation module at the closure cover (32) of the module housing (4) (both not shown in FIG. 3)
26 retentate outlet of the module housing
27 fluid barrier at the rear end of the PSR (13)
28 gap between end cap EK1 (5a) and the inner surface of the module housing (4)
29 intervening cavity between cartridge (1a) and (1b) in the module housing (4)
30 connection of the PSR (13) of cartridge (1a) and cartridge (1b)
31 end cavity in the module housing (4)
32 closure cover of the module housing (4) (not shown in FIG. 3)

The invention claimed is:

1. A cartridge for separating a fluid mixture, said cartridge comprising a membrane element and a sealing element that is selected for its ability to connect with a module housing of a fluid separation module;
wherein the membrane element comprises:
hollow-fibre membranes or spiral wound flat-sheet membranes having a front end and a rear end at opposite sides;
a front closure at said front end;
a rear closure at said rear end; and
optionally a barrier which is impermeable to the fluid mixture to be separated and is arranged around the membranes in the region between said front closure and said rear closure;
and wherein the sealing element is an independent element of the cartridge, separate from the membrane element, and comprises two parts, of which:
one part is a seal which, after installation of the cartridge into the module housing of a fluid separation module, tightly adjoins the inner wall of the module housing; and
a further part is a carrier element which bears the seal and which is reversibly fixed to the front closure and/or to the rear closure of the membrane element in a manner such that disconnection does not cause destruction of the membrane element and that permits the cartridge thereby formed to connect to the module housing of the fluid separation module; and
wherein the membrane element can be used in separation system housings of different geometries by changing only the sealing element.

2. The cartridge of claim 1, wherein the membrane element comprises:
a permeate collecting tube which consists of one or more segments and has a front end and a rear end,
at least one bundle of hollow-fibre membranes which has a front end and a rear end and is arranged around the permeate collecting tube, the permeate collecting tube or all segments of the permeate collecting tube having one or more orifices or pores between said bundle front end and said bundle rear end,
a first casted section at said bundle front end and said permeate collecting tube front end and a second casted section at said bundle rear end and said permeate collecting tube rear end, the cores of the hollow-fibre membranes being open at least at said bundle front end,
at least one fluid entry orifice into the membrane element or fluid exit orifice out of the membrane element in the front closure, and
at least one fluid entry orifice into the membrane element or fluid exit orifice out of the membrane element in the rear closure.

3. The cartridge of claim 2, wherein:
a) the fluid mixture is a gas mixture;
b) the seal of the sealing element is an O ring or another seal that acts by continually adjoining the inner wall of the module housing;
c) the cores of the hollow-fibre membranes are open at said bundle front end and said bundle rear end.

4. The cartridge of claim 1, wherein the membrane element comprises:
a permeate collecting tube which consists of one or more segments and has a front end and a rear end;
at least one bundle of the hollow-fibre membranes wherein the membranes have a front end and a rear end and are arranged around the permeate collecting tube, or all segments of the permeate collecting tube and configured in the region between said bundle front end and said bundle rear end so as to be impermeable to the fluid mixture to be separated;
a first casted section at said bundle front end and said permeate collecting tube front end and a second casted section at said bundle rear end and said permeate collecting tube rear end, the hollow fibres at said bundle front end in said first casted section being enclosed in such a way that the cores of the hollow-fibre membranes are open and the hollow fibres at said bundle rear end in said second casted section being enclosed in such a way that they are closed;
a front end cap, as said front closure, placed onto the first casted section and configured in such a way that a front end cap cavity is formed between an outer end face of said first casted section where the permeate flows out of the hollow-fibre cores and an inner surface of the front end cap;

permeate exit orifices in the permeate collecting tube or in a segment of the permeate collecting tube in the region of the front end cap cavity, such that there is fluid communication between the front end cap cavity and the interior of the permeate collecting tube;

at least one exit orifice for retentate in the last quarter of the distance between said first casted section and said second casted section or embedded into said second casted section;

optionally a rear end cap, placed onto the second casted section, with said rear end cap or said second casted section forming the rear closure, said rear end cap having at least one exit orifice for retentate.

5. The cartridge of claim 1, further comprising a permeate collecting tube which consists of several segments connected to one another within a membrane element by a connection selected from the group consisting of: a screw connection, a flange connection, a plug-in connection, a bayonet closure, and an adhesive bonding.

6. The cartridge of claim 1, comprising hollow-fibre membranes consisting of polyimides.

7. The cartridge of claim 6, wherein the polyimides are obtainable by reaction of at least one dianhydride selected from the group consisting of: 3,4,3',4'-benzophenone-tetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride and 1,1,1,3,3,3-hexafluoro-2,2-propylidenediphthalic dianhydride, and at least one diisocyanate selected from the group consisting of toluene 2,4-diisocyanate, toluene 2,6-diisocyanate, 4,4'-methylenediphenyl diisocyanate, 2,4,6-trimethyl-1,3-phenylene diisocyanate and 2,3,5,6-tetramethyl-1,4-phenylene diisocyanate.

8. The cartridge of claim 1, wherein the carrier element bearing the seal is reversibly fixed to the front closure and/or to the rear closure of the membrane element by screws, clamped with grip elements or attached with an adhesive that permits destruction-free separation of the of the carrier element.

9. The cartridge of claim 1, wherein the carrier element bearing the seal is reversibly fixed to the front closure and/or to the rear closure of the membrane element by screws, barbs or latching hooks.

10. The cartridge of claim 1, wherein the carrier element bearing the seal is reversibly fixed to the front closure and/or to the rear closure of the membrane element using a silicone adhesive that permits destruction-free separation.

11. A cartridge for separating a fluid mixture, said cartridge comprising a membrane element and a sealing element that is selected for its ability to connect with a housing of a fluid separation module;

wherein the membrane element comprises:
hollow-fibre membranes having a front end and a rear end at opposite sides;
a front closure at said front end;
a rear closure at said rear end;
and wherein the sealing element is an independent element of the cartridge, separate from the membrane element, and comprises two parts, of which:
one part is a seal which, after installation of the cartridge into the housing of a fluid separation module, tightly adjoins the inner wall of the module housing; and
a further part is a carrier element which bears the seal and which is reversibly fixed to the front closure and/or to the rear closure of the membrane element in a manner such that disconnection does not compromise the internal sealing between the feed and permeate of the membrane element and that permits the cartridge thereby formed to connect to the housing of the separation system in a fluid tight manner; and
wherein the membrane element can be used in separation system housings of different geometries by changing only the sealing element.

12. The cartridge of claim 11, wherein the carrier element bearing the seal is reversibly fixed to the front closure and/or to the rear closure of the membrane element by screws, clamped with grip elements or attached with an adhesive that permits destruction-free separation of the of the carrier element.

13. The cartridge of claim 11, wherein the carrier element bearing the seal is reversibly fixed to the front closure and/or to the rear closure of the membrane element by screws, barbs or latching hooks.

14. The cartridge of claim 11, wherein the carrier element bearing the seal is reversibly fixed to the front closure and/or to the rear closure of the membrane element using a silicone adhesive that permits destruction-free separation.

15. A cartridge for separating a fluid mixture, said cartridge comprising a membrane element and a sealing element that is selected for its ability to connect with a housing of a fluid separation module;

wherein the membrane element comprises:
spiral wound flat-sheet membranes having a front end and a rear end at opposite sides;
a front closure at said front end;
a rear closure at said rear end; and
a barrier which is impermeable to the fluid mixture to be separated and is arranged around the membranes in the region between said front closure and said rear closure;
and wherein the sealing element is an independent element of the cartridge, separate from the membrane element, and comprises two parts, of which:
one part is a seal which, after installation of the cartridge into the housing of a fluid separation module, tightly adjoins the inner wall of the module housing; and
a further part is a carrier element which bears the seal and which is reversibly fixed to the front closure and/or to the rear closure of the membrane element in a manner such that disconnection does not compromise the internal sealing between the feed and permeate of the membrane element, and that permits the cartridge thereby formed to connect to the housing of the separation system in a fluid tight manner; and
wherein the membrane element can be used in separation system housings of different geometries by changing only the sealing element.

16. The cartridge of claim 15, wherein the carrier element bearing the seal is reversibly fixed to the front closure and/or to the rear closure of the membrane element by screws, clamped with grip elements or attached with an adhesive that permits destruction-free separation of the of the carrier element.

17. The cartridge of claim 15, wherein the carrier element bearing the seal is reversibly fixed to the front closure and/or to the rear closure of the membrane element by screws, barbs or latching hooks.

18. The cartridge of claim 15, wherein the carrier element bearing the seal is reversibly fixed to the front closure and/or to the rear closure of the membrane element using a silicone adhesive that permits destruction-free separation.

19. The cartridge of claim 15, wherein the barrier which is impermeable to the fluid mixture to be separated has one or more fluid entry orifice(s) or gap(s) to an interspace between the impermeable barrier and the permeate collecting tube at a distance of 0 to 10 cm behind an inner end face of the first casted section, the distance being based on the longitudinal axis of the cartridge.

20. The cartridge of claim 19, wherein the impermeable barrier consists of a film, a hose, a tube, a tape or a glass fabric blended in with an epoxy resin fixed to the membrane element by a method selected from the group consisting of: shrinking, casting into a first casted section, casting into a second casted section, fixing with external aids, welding, adhesive bonding, and combinations thereof.

* * * * *